UNITED STATES PATENT OFFICE.

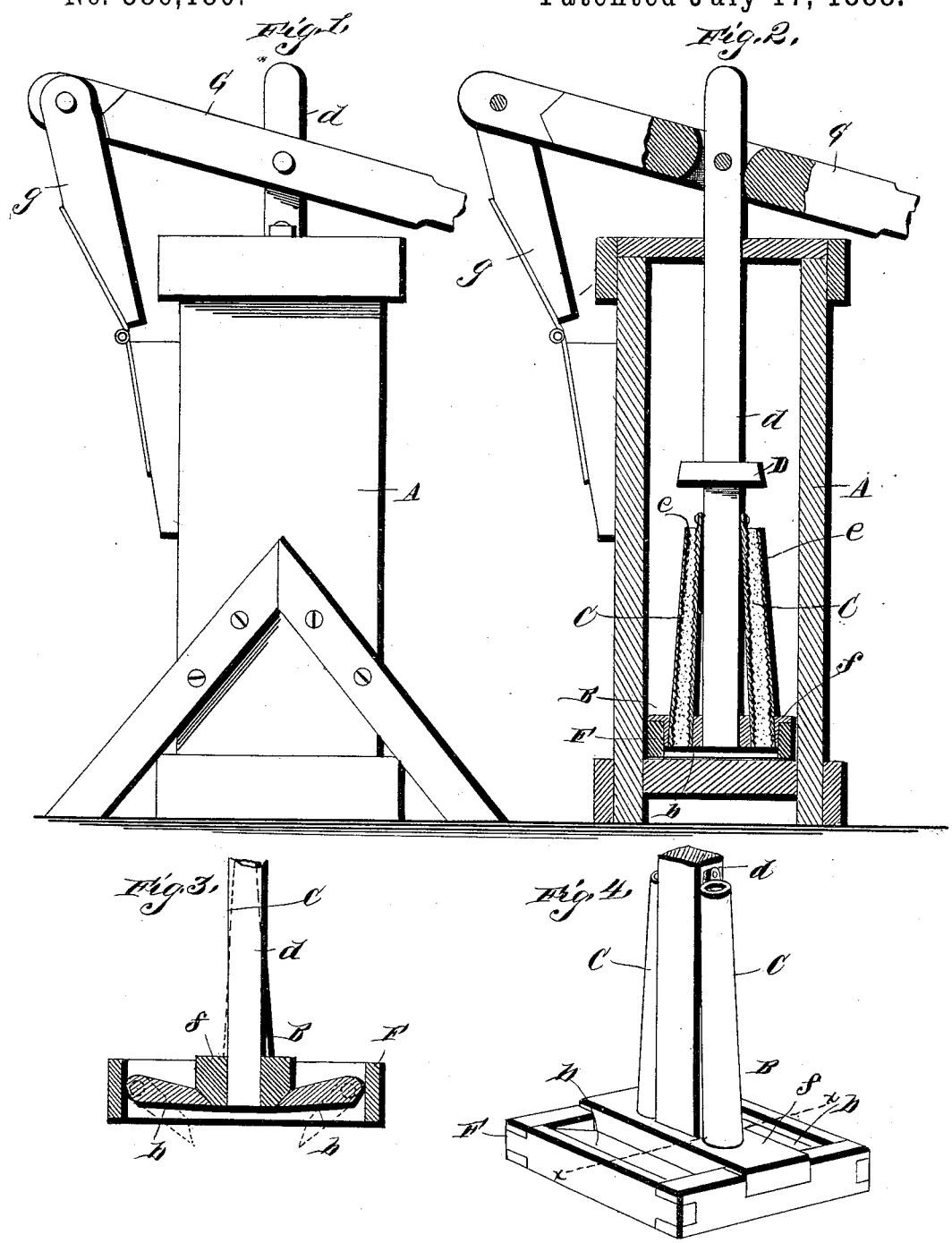

JOSEPH E. BENJAMIN, OF HUBBELL, NEBRASKA.

CHURN.

SPECIFICATION forming part of Letters Patent No. 386,180, dated July 17, 1888.

Application filed May 10, 1888. Serial No. 273,472. (No model.)

*To all whom it may concern:*

Be it known that I, JOSEPH E. BENJAMIN, a citizen of the United States, residing at Hubbell, in the county of Thayer and State of Nebraska, have invented certain new and useful Improvements in Churns; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to churns, and has for its object to improve this class of devices, whereby the process of churning is greatly facilitated and the cream is thoroughly aerated without the provision of special means to force the air into the cream.

The improvement consists, chiefly, of a tube carried by the dasher, and having projections extending from its inner walls, which in the process of churning break up the globules of cream and liberate the butter. This tube is tapering, being wider at the bottom than at its top, to compel the cream rushing through the tube to bear against the ragged and roughened sides of the tube.

The improvement further consists of the peculiar construction and combination of the parts which hereinafter will be more fully described and claimed, and shown in the drawings, in which—

Figure 1 is a side view, having the end of the lever broken away, of a churn embodying my invention; Fig. 2, a vertical central sectional view of the churn; Fig. 3, a vertical section of the dasher about on the line X X of Fig. 4, and Fig. 4 is a perspective view of the lower portion of the dasher.

The churn-body A is of common construction except that it has parallel walls, and the dasher B fits snugly within the churn-body, and has valves $b$, which open downward to permit the cream above the dasher to pass beneath the same when the dasher is drawn to the top of the churn. The tube or tubes C, carried by the dasher, taper from their lower ends upward and are provided with inner projections, $e$, which roughen the inner walls of the tubes and break up the globules of cream. The dash-block D, secured to the dasher-rod $d$, above the end of the tube or tubes C, effects a spreading of the cream as it leaves the tube or tubes.

The dasher is composed of the frame F and the central cross-bar $f$, which receives the lower end of the rod $d$, and has the lower end of the tube or tubes C inserted in openings therein. The valves are hinged at their outer ends and have their inner ends beveled and adapted to close against the beveled edges of the cross-bar $f$.

The dasher may be reciprocated by any known means, as the lever G, which is pivotally connected with the rod $d$ and is pivotally supported at its end on the standard $g$.

The cream to be churned is placed in the churn, and when the dasher is forced down the valves $b$ will close and the cream will rush through the tube or tubes and strike against the dasher-block and be spread out in a thin sheet, thus exposing a large surface for the action of the air.

The roughened surface of the tube will rend asunder the globules of cream and liberate the butter, thus facilitating the process of churning.

Having thus described my invention, what I claim, and desire to secure by Letters Patent, is—

1. In a churn, the combination, with the dasher, of the tube having its inner walls roughened, substantially as and for the purpose described.

2. In a churn, the combination, with the dasher, of the tapering tube having its inner walls roughened, substantially as and for the purpose specified.

3. The combination, with the churn-body and the dasher fitting snugly within the churn-body, of the rod, the valves opening downward, the dash-block, and the tapering tube having its inner walls roughened, substantially as specified.

In testimony whereof I affix my signature in presence of two witnesses.

JOSEPH E. BENJAMIN.

Witnesses:
 S. F. VINTON,
 N. E. WOODS.